3,259,940
ADJUSTABLE DRIVE IN PLASTIC EXTRUDER
Leslie J. Kovach, Clifton, and Bruno V. Menegus, Wayne, N.J., assignors to Modern Plastic Machinery Corporation, Clifton, N.J., a corporation of Delaware
Filed Oct. 14, 1964, Ser. No. 403,733
5 Claims. (Cl. 18—12)

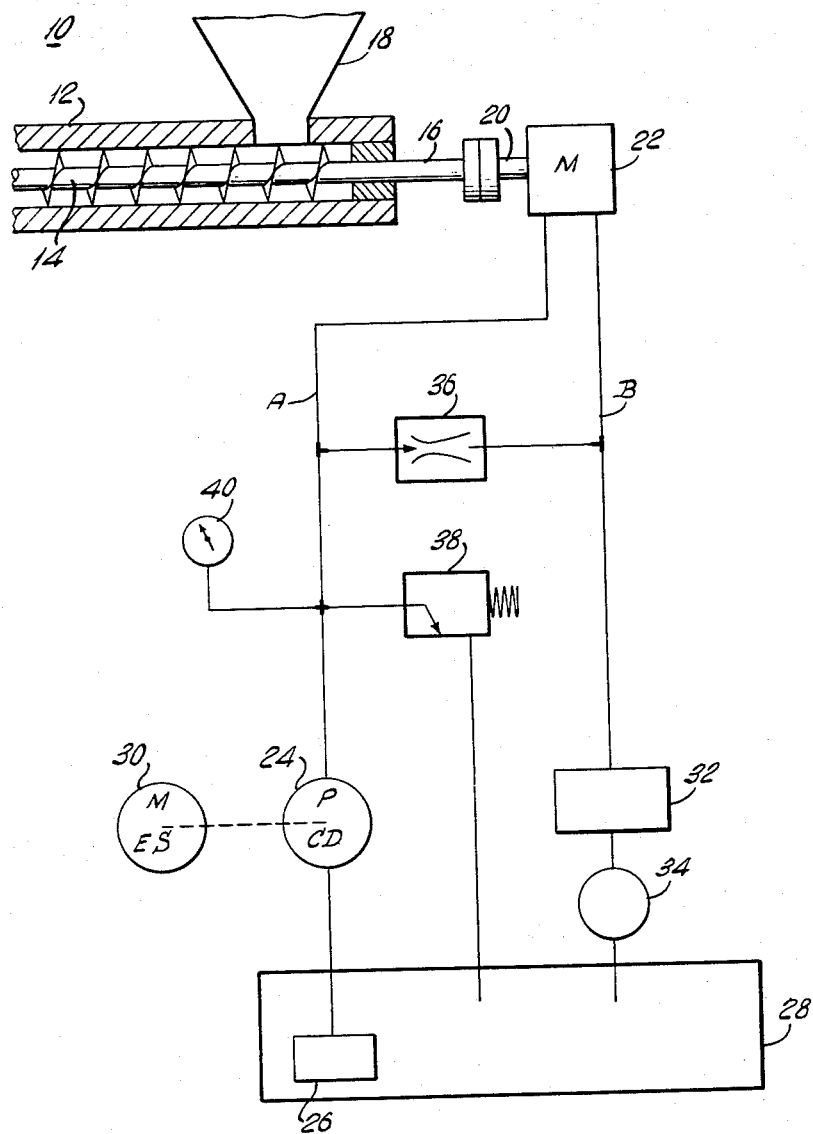

The present invention relates generally to improvements in materials treating equipment. It relates in particular to a plastic extruder provided with an improved adjustable drive mechanism.

The conventional apparatus for plasticizing and extruding synthetic organic thermoplastic polymeric resins generally includes a longitudinally extending heated barrel, an axially extending worm or screw and an electric drive motor coupled to the screw, usually by way of a belt and pulley arrangement. In order to attain a uniform product of optimum quality it is necessary to control the various operating parameters of the extrusion apparatus closely, including the temperature of the plastic resin as it traverses the barrel, the speed of the advancing screw and the maximum torque imparted thereto.

There are available many satisfactory systems for suitably controlling the resin temperature along the extruder barrel. However, the systems heretofore employed for driving the extruder screw and for controlling the speed and maximum torque thereof possess many drawbacks and disadvantages. Major problems are encountered in the adjustment of the speed and maximum torque of the extruder screw and in maintaining these constant at the adjusted levels. While a continuous adjustment of these parameters is available by the control of the electric motor drive, the equipment required to effect such control is bulky, complex, very expensive and unreliable. Also, it is difficult to service and maintain and otherwise leaves much to be desired.

It is, therefore, a principal object of the present invention to provide an improved apparatus for the handling and treating of materials.

Another object of the present invention is to provide an improved extruder for synthetic organic thermoplastic polymeric resins.

Still another object of the present invention is to provide a plastic extruding apparatus including an improved drive mechanism.

A further object of the present invention is to provide an improved plastic extruder provided with a variable speed, variable maximum torque screw drive mechanism.

Still a further object of the present invention is to provide an improved apparatus of the above nature characterized by its simplicity and ruggedness of construction, reliability, versatility in operation, and low cost.

The above and other objects of the present invention will become apparent from a reading of the following description taken in conjunction with the accompanying drawing, wherein the single figure is a diagrammatic view of a plastic extruded drive system embodying the present invention.

In a sense, the present invention contemplates the provision of the combination comprising an extruder including an axially extending rotatable screw, a positive displacement hydraulic motor having a drive shaft coupled to said screw, a positive displacement hydraulic pump, an electric motor connected to said pump, and means including an adjustable pressure regulator and an adjustable flow regulator connecting said hydraulic pump to said hydraulic motor.

According to a preferred form of apparatus of the present invention, there is provided a main oil reservoir, the pump inlet being connected to the reservoir by way of a first oil filter and the hydraulic motor outlet being connected to the reservoir through a second oil filter and an oil cooler. The adjustable flow regulator comprises a flow control valve connected between the inlet and outlet of the hydraulic motor and the pressure regulator comprises a relief valve having an inlet connected to the hydraulic motor inlet and an outlet connected to the oil reservoir.

Referring now to the drawing which illustrates a preferred embodiment of the present invention, reference numeral 10 generally designates a plastic extruder and plasticizer of any well known construction, and may be of the continuously extruding type, of the screw injector type or of any conventional type. Extruder 10 includes an elongated cylindrical barrel heated and temperature-regulated in any suitable manner, and housing a rotatable coaxial feed and plasticizing screw 14. Screw 14 is provided at its trailing end with a coaxial drive shaft 16 projecting rearwardly through barrel 12 and in fluid tight association therewith. A hopper 18 is mounted atop the trailing section of barrel 12 and communicates with the interior thereof through an opening formed in the barrel.

Screw drive shaft 16 is coupled preferably directly or by way of a gear transmission unit, to the drive 20 of a positive displacement hydraulic motor 22, as for instance a fixed displacement piston type hydraulic motor. The oil inlet to motor 22 is connected by way of a high pressure line A to the outlet of a positive displacement high pressure hydraulic pump 24. The inlet to the hydraulic pump 24 is connected by way of an oil filter 26 to a main hydraulic fluid or oil reservoir or tank 28. Pump 24 is driven by a constant speed electric motor 30 to which it is advantageously directly axially coupled. Pump 24 may be of the constant displacement vane type having its drive shaft coaxially coupled to motor 30.

The outlet of hydraulic motor 22 is connected by way of a high pressure line B to the inlet of an oil filter 32, the outlet of which is connected through an oil cooler 34 to the hydraulic fluid reservoir 28.

In order to control the speed of hydraulic motor 22 and hence that of the plasticizing and feed screw 14 an adjustable flow control valve 36 is connected between oil lines A and B, the inlet of valve 36 being connected to line A and its outlet connected to line B. One type of flow control valve which may be employed to advantage is the Vickers flow control valve Model FG–03–28–20, although any known similarly functioning flow control valve may be employed. By adjusting flow control valve 36, the speed of hydraulic motor 22 is adjusted, an increase in the flow rate through valve 36 resulting in a decrease in the rate of oil delivery to hydraulic motor 22 and hence the speed thereof, and a decrease in the flow rate through valve 36 resulting in an increase in the speed of hydraulic motor 22.

The maximum torque delivered by the hydraulic motor 22 to the feed and plasticizing screw 14 is adjustable by regulating the maximum pressure in oil feed line A. The maximum pressure in line A, in turn, is regulated by means of a pressure relief valve 38 having its inlet connected to line A and its outlet connected to reservoir 28. Thus, the maximum torque which may be transmitted to feed screw 14 is controlled by adjusting the opening pressure of relief valve 38. While relief valve 38 is locally adjustable, it is also advantageously of the remotely adjustable type and has its inlet connected to a pressure gauge 40 providing an indication of the pressure in the line A and hence the torque on feed screw 14.

It will be understood from the above that with the present apparatus, a highly versatile drive has been provided for a plastic extruder in which the extruder screw speed and maximum torque are adjustable over wide ranges. Moreover, the subject apparatus is inexpensive to install and operate, and is rugged and reliable in operation.

While there has been described and illustrated a preferred embodiment of the present invention, it will be clear that numerous alterations, omissions and additions may be made without departing from the spirit thereof.

What is claimed is:

1. In combination with an extruder including an axially extending rotatable screw, a positive displacement hydraulic motor having a drive shaft coupled to said screw, a positive displacement hydraulic pump, an electric motor connected to said pump, an adjustable pressure regulator and an adjustable flow regulator connecting said hydraulic pump to said hydraulic motor.

2. In combination with an extruder including an axially extending rotatable screw, a positive displacement hydraulic motor having a drive shaft coupled to said screw, a positive displacement hydraulic pump, a constant speed electric motor connected to said pump, and an adjustable pressure regulator and an adjustable flow regulator connecting said hydraulic pump to said hydraulic motor.

3. In combination with an extruder including an axially extending rotatable screw, a hydraulic fluid reservoir, a positive displacement hydraulic motor having a drive shaft coupled to said screw and including an outlet communicating with said reservoir and an inlet, a positive displacement hydraulic pump having an inlet communicating with said reservoir and an outlet connected to said hydraulic motor inlet, a constant speed electric motor connected to said hydraulic pump, an adjustable flow regulated by-pass unit connected between said hydraulic motor inlet and said reservoir and an adjustable pressure relief valve having an inlet connected to said hydraulic motor inlet and an outlet communicating with said reservoir.

4. The combination of claim 3, wherein said hydraulic motor drive shaft is directly coupled to said screw.

5. The combination of claim 3, including an oil cooler connected between the outlets of said flow regulated by-pass unit and said hydraulic motor and said reservoir.

References Cited by the Examiner

UNITED STATES PATENTS 2,411,971  12/1946  McMillen et al. _____ 18—12

FOREIGN PATENTS 699,683  12/1964  Canada.

WILLIAM J. STEPHENSON, *Primary Examiner.*